United States Patent [19]

Varenchuk et al.

[11] Patent Number: 5,030,817
[45] Date of Patent: Jul. 9, 1991

[54] APPARATUS FOR OVERHEAD SUBMERGED ARC WELDING

[76] Inventors: Pavel A. Varenchuk; Valentin D. Kovalev, both of Kiev, U.S.S.R.

[21] Appl. No.: 460,925
[22] PCT Filed: Dec. 14, 1988
[86] PCT No.: PCT/SU88/99265
 § 371 Date: Feb. 6, 1990
 § 102(e) Date: Feb. 6, 1990
[87] PCT Pub. No.: WO89/11947
 PCT Pub. Date: Dec. 14, 1989

[30] Foreign Application Priority Data

Jun. 6, 1988 [SU] U.S.S.R. .............. 4429056

[51] Int. Cl.⁵ .............................. B23K 9/18
[52] U.S. Cl. .................................. 219/73.2
[58] Field of Search .................. 219/73, 73.2

[56] References Cited

FOREIGN PATENT DOCUMENTS 3430371 2/1986 Fed. Rep. of Germany .
3430394 2/1986 Fed. Rep. of Germany .
1348111 10/1987 U.S.S.R. .
1397218 5/1988 U.S.S.R. .

1397218 5/1988 U.S.S.R. .

Primary Examiner—Clifford C. Shaw
Attorney, Agent, or Firm—Lilling and Lilling

[57] ABSTRACT

An apparatus for overhead submerged-arc welding includes a driven trolley supporting a vertical slide with a carriage. On the carriage (22) is mounted an arm on the end of which with a possibility of swinging with respect to its longitudinal and transverse planes there is located a forming means. The apparatus also has a hopper with flux accommodating a nozzle for a consumable electrode, a bowl provided in the top part of the hopper through which extends the nozzle for the consumable electrode (14) and means for supplying and pressing the flux. The hopper is mounted on the pivot pin disposed on a front wall (18) of the forming means to extend in parallel with a transverse axis thereof and aligned with the upper and face of a rear wall of the bowl located adjacent to the nozzle. Such location of the pivot pin supporting the hopper (1) and the forming means ensures swinging of the bowl in transverse direction and constant preset flux pressure in the welding zone.

The present invention may be used for welding of longitudinal and rotatable annular joints.

1 Claim, 1 Drawing Sheet

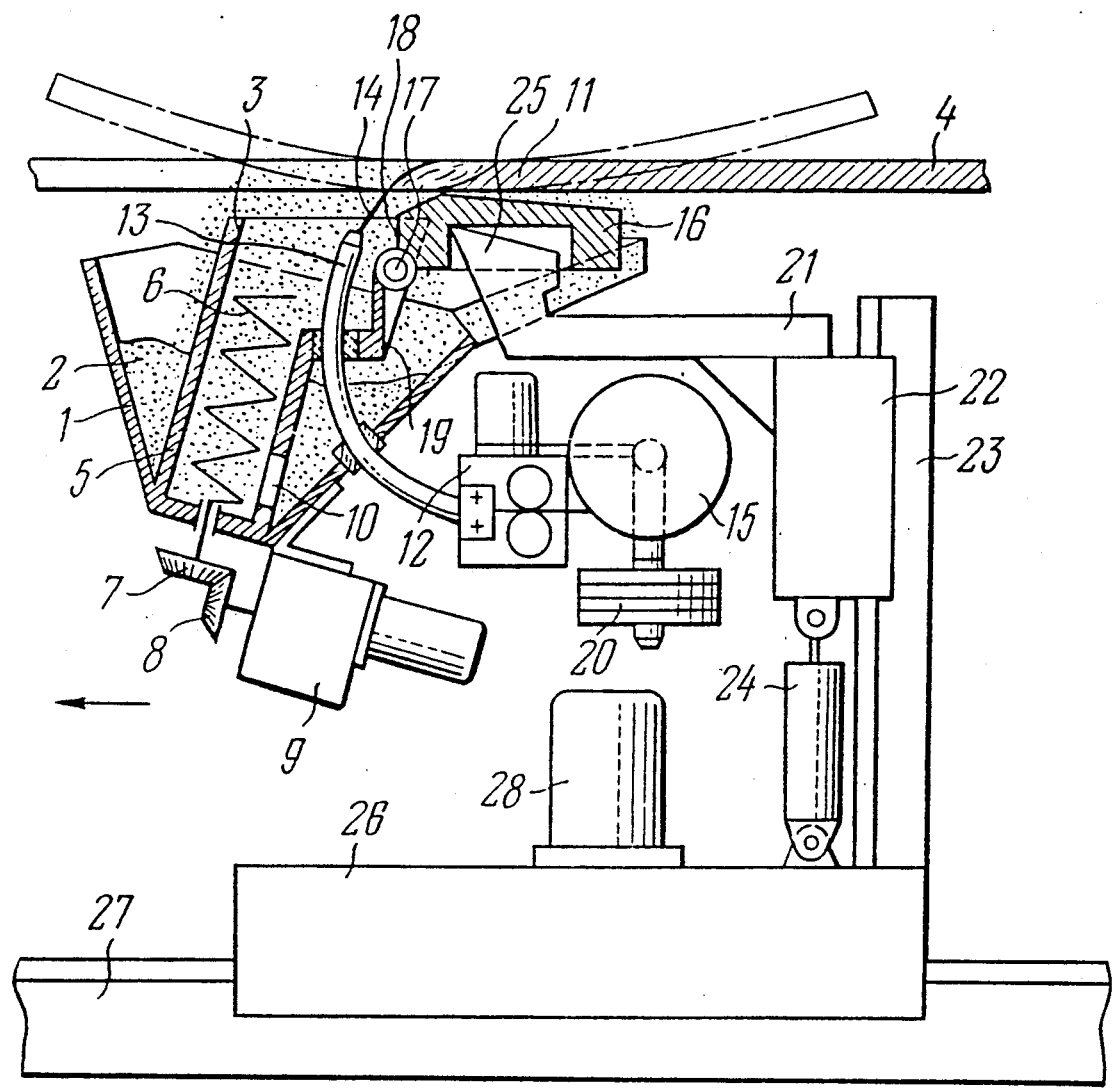

APPARATUS FOR OVERHEAD SUBMERGED ARC WELDING

BACKGROUND OF THE INVENTION

1. Field of the Invention

The invention relates to equipment for arc welding and, in particular, it deals with an apparatus for overhead submerged arc welding.

2. Description of the Related Art

A large volume of operations in the manufacture of welded structures is carried out in welding rotatable annular joints of hollow structures with a restricted access to joints being welded on the inner side of the structure. Such joints include annular joints of closed vessels, annular joints of pipelines, tanks, casings, field welds and shell plating seams of ship hulls; longitudinal joints of large-area products which cannot be positioned to facilitate welding. They also include joints of difficult-to-position webs, segments, three-dimensional and planar sections, and the like.

A submerged arc overhead welding method is characterized in that a consumable electrode and a welding bath are turned at 180° in comparison with downhand welding. Flux and electrode are fed to the work from bottom up, i.e. as though towards a ceiling, the electrode being supplied through a compacted flux.

This welding method is referred to hereinbelow as overhead submerged arc welding.

This welding method is referred to as overhead submerged arc welding also because the arc is in the body of metal.

So called welds are produced as a result of such welding.

Overhead welds may be of different types, e.g. penetration overhead welds, sealing overhead welds. There may be one-pass overhead welds and other types of overhead welds.

The penetration overhead welds are welds which are first to be produced in welding of a joint and which are located in the top part of sections being welded on the joint side opposite with respect to the electrode supply. Further welding of the joint, i.e. producing the necessary subsequent welds is carried out by any appropriate known method, the electrode being supplied on the same side as is the case with welding of the overhead penetration weld, e.g. the inner penetration welds of rotatable annular joints of vessels, tanks, joints between bottom sections of shell plating of ships and other structures.

The overhead penetration weld arc welding allows to a large extent the operation of welding from the interior of a vessel to be dispensed with in welding rotatable annular welds, and welding in confined spaces in producing straight welds of structures with a restricted access on the side of a ceiling can also be eliminated.

The sealing overhead welds are welds which are first to be produced in welding a joint and which are located on the bottom part of sections being welded on the electrode supply side of the joint. Further welding is carried out by any appropriate known method with the electrode supply on the side of the joint being welded opposite to that used in the overhead welding.

In practice, the penetration overhead welds are produced in welding annular and longitudinal joints of structures with a restricted access to joints being welded from the inside, the sealing welds being produced in welding longitudinal joints of difficult-to-position products, e.g. plate structures made out of segments, and other products.

One-pass overhead welds include welds produced in welding joints of a limited thickness arranged over the whole welded section. No further welding of the joint on any side thereof will be required.

Welding of sealing and one-pass welds poses many problems concerned with the formation of the surface of a finished weld.

During the overhead welding, the welding bath metal formed during arcing by fusion of the metal being welded, electrode material and flux is retained by a crust of partly melted flux and also by means of forming members. The forming members may be of various shapes and size and may be made, e.g. on the form of plates, backings, bars, sliders and other members and structures.

Flux is pressed against the welding zone positively from bottom up and, as flux is being consumed, its stock is continually replenished. For forming the part of a weld, flux may be supplied both on the bottom side, through the gap between the edges of a product being welded, and from the top by any appropriate known method when a filled layer of flux is formed. Special forming backings of flux holding means may also be used.

Numerous problems arise especially in welding hard to get at joints of large-size products of cylindrical or like configuration such as ship hulls and boiler units where especially high quality of welds is required and where the products must be rotated about their axis during welding operations, as well as in welding large-area planar products which it is very difficult to place in a position facilitating the welding.

Known in the art is an apparatus for overhead submerged arc welding (SU, A, 1348111), comprising a driven trolley supporting a vertical slide having a carriage. The carriage supports an arm and a self-aligning forming means, a hopper containing flux, and a copying member are provided at the end of the arm by means of a pivot pin. A bowl with a nozzle extending therethrough is provided in the hopper, in the top part thereof, and a welding head is mounted directly on the hopper. In addition, an auger feeder communicating with the bowl and having an auger rotation drive is mounted in the hopper.

The construction of this prior art apparatus allows both absolute flux pressure value in the bowl and force with which the forming means is pressed against a work being welded and the ratio between them to be varied.

This apparatus allows welding to be carried out with the desired weld forming on either side over a broad range of process capabilities with a large range of welded products.

However, as the forming means and copying member of this apparatus are mounted on one and the same pivot pin, the work can force the forming means away in case of a substantial convexity of the joint being welded so that position of the axis of rotation of the hopper and copying member with respect to the surface of the work being welded undergoes a substantial change. This results in an abrupt change in flux pressure in the bowl as compared with present pressure values at various points where welding bath is formed (upstream of the arc, in the area of the arc, in the area of the welding bath and in the solidification zone of the welding bath), i.e. in disruption of the welding process as a whole and, hence, in impaired quality of the welded joint.

In cases of a substantial concavity of the joint being welded on the underside of the joint the forming means is separated from the surface and a substantial additional clearance forms between the working face of the forming means and the work so as to disrupt the welding process as well.

In addition, the fact that the hopper with the bowl is supported by means of a common pivot pin mounted on the arm of the carriage of the vertical slide in such apparatus cannot allow the bowl to swing in its transverse plane which results in fluctuations of flux pressure in the bowl during welding.

Also known in the art is an apparatus for overhead submerged arc welding (DE, C, 3430394), comprising a driven trolley supporting a vertical slide having a carriage, a forming means mounted for swinging in its longitudinal and transverse planes on an end of an arm supported on the carriage of the vertical slide, and a hopper containing flux mounted on a pivot pin and having a welding head with a nozzle for a consumable electrode, a bowl provided in the top part of the hopper, the end of the nozzle for a consumable electrode extending through the bowl, and means for supplying flux and pressing it against the work. The pivot pin of the hopper is mounted on an arm which is mounted for movement in the direction towards the work being welded. The forming means is supported by the arm by means of an individual pivot pin. The arm also supports a copying member which is engageable with the surface of the work being welded during welding.

The carriage drive and the vertical slide are mounted on the driven trolley for moving the whole apparatus in the welding direction.

This apparatus allows a permanent contact between the forming means and copying member on the one hand and the work being welded on the other hand to be maintained during welding under various fluctuations of parameters of assembly before welding and geometry of the joint being welded (e.g. misalignment of plate edges, convexity or concavity, undulations, clearances, and the like).

Therefore, irrespective of any changes in position of the forming means caused by a change in profile of the surface of the work being welded at the point of engagement with the forming means, the copying member remains in permanent contact with the work surface thereby preventing the forming means from affecting the position of the hopper containing flux. This facility allows undesirable oscillations of the hopper under fluctuations of profile of the work surface to be eliminated, and welding parameters such as thickness of a flux backing and flux pressure in the welding zone can be stabilized.

The flux backing is an area of a compacted compressed layer of flux in which a preset pressure distributed over the whole area of the flux backing obtains and which is located between the top surface of the bowl having its open part facing towards the work being welded and the surface of the work being welded, which exerts pressure upon the surface of the joint being welded in the welding zone.

The suspension pivot of the forming means in the prior art apparatus may be made in the form of a point-like abutment at the end of a double-arm lever. The fulcrum of the lever is attached to an arm, and the other arm of the lever is connected to a power actuator which is pivotally connected to said carriage arm. The copying member in the form of a wheel is mounted on the pivot pin of the hopper.

This construction of the apparatus provides conditions for a smooth copying of the surface of the joint being welded by the forming means to maintain stability of preset flux layer pressure during welding.

In one embodiment of the prior art apparatus, the suspension pivot of the forming means is in the form of a point-like abutment at the end of an arm provided adjacent to the welding nozzle. The copying member is in the form of projections on the surface of the forming means. The suspension pivot of the hopper is located on the side of the forming means opposite to the nozzle, and the hopper is provided with a means for moving the hopper with respect to its suspension pivot.

This construction of the apparatus makes it possible to provide conditions for a smooth copying of the surface of the joint being welded by the forming means and to adjust position of the hopper with respect to the work being welded which is necessary in welding works having different geometry.

In carrying out welding with this apparatus, it is possible to ensure automatic conduct of the welding process in producing overhead welds and to obtain high-quality welded joints owing to the creation and maintenance of preset flux pressures at various points along the joint being welded (upstream the arc, in the area of the arc, in the area of the welding bath and in the area downstream the welding bath and up to the formed weld).

This apparatus allows high-quality welding of overhead welds over a broad range of process capabilities to be carried out. However, the fact that the hopper with bowl, welding head, auger feeder and other components are mounted in the prior art apparatus on a pivot pin supported by an arm of the carriage of the vertical slide cannot ensure swinging of the bowl in its transverse plane, whereby deviations from present flux pressure in the welding zone and in the areas of formation of the welding bath occur in welding works with substantial local fluctuations of geometry and joint assembly, (especially with large alternating misalignments of edges of the joints being welded as well as in cases of tapering joints, e.g. in welding bottoms of railway tanks, boilers, vessels, and the like having one-sided misalignments of weld reinforcements at points of T-crossings of longitudinal and annular welds and quality of overhead welds is impaired as a whole.

SUMMARY OF THE INVENTION

The main object of the present invention is to provide an apparatus for overhead sumberged arc welding in which corresponding constructive location of a pivot pin supporting a hopper and relative disposition of the hopper and forming means would allow swinging of the bowl in its transverse plane and maintenance of a preset flux pressure in the welding zone which is necessary for high-quality overhead welding on either side of the weld.

This object is accomplished by an apparatus for overhead submerged arc welding, comprising a driven trolley supporting a vertical slide with a carriage, a forming means mounted for swinging with respect to its longitudinal and transverse planes and located at the end of an arm mounted on the carriage of the vertical slide, hopper containing flux which is mounted on a pivot pin and which accommodates a nozzle for a consumable electrode, a bowl provided in the top part of the hopper, the nozzle for a consumable electrode extending through the bowl, and means for supplying flux and for pressing it against a work. According to the invention, the pivot pin supporting the hopper containing flux is provided on a front wall of the forming means to extend in parallel with a transverse axis thereof and is aligned with the upper end face of a rear wall of the bowl located adjacent to the nozzle.

This construction of the apparatus for overhead submerged arc welding in which the pivot pin supporting the hopper containing flux, bowl, means for supplying flux and pressing it against the work, and welding head is mounted on the forming means ensures the equidistant position of the pivot pin supporting the hopper with respect to the joint being welded during welding. Copying of position of the pivot pin supporting the hopper with respect to the work surface at the point of welding also takes place in cases of substantial local disruptions of geometry and assembly of joints, especially with large alternating misalignments of plate edges and in cases of tapering joints, e.g. in welding bottoms of railway tanks, boilers, receivers and other structures, especially with one-sided misalignments at weld reinforcements, at points of T-crossings of longitudinal and annular welds. Therefore, upon a change in position of the forming means during welding a similar necessary change in position of the pivot pin supporting the hopper occurs so that the hopper is capable of swinging together with the forming means with respect to its longitudinal and transverse planes. This facility allows oscillations to be imparted to the hopper in the longitudinal and especially in the transverse plane, which is necessary to ensure copying of the underside of the work being welded by the top open part of the bowl upon changes in profile of the work surface and to stabilize thereby welding parameters such as constant flux backing thickness, flux pressure at various points along the welding bath being formed with a higher accuracy.

Providing the pivot pin supporting the hopper on the front wall of the forming means allows optimum conditions to be provided for cooperation of the bowl with the forming means. The arrangement of the pivot pin supporting the hopper to extend in parallel with the axis of the forming means and its alignment with the upper end face of the rear wall of the bowl located adjacent to the welding nozzle provide for the creation and maintenance of a preset flux pressure in the bowl and prevent flux from spillage and jamming between the forming means and the rear wall of the bowl. In addition, with this construction, structural conditions are provided for stabilizing the electrode extension during welding and for maintaining a preset thickness of the flux backing over the whole area thereof, i.e. over the whole surface area of the top open part of the bowl.

This construction of the apparatus also contributes to a distribution of forces of pressure of the forming means and the hopper bowl against the work being welded necessary for the overhead submerged arc welding. This facility ensures a substantial improvement of quality of overhead welds as a whole.

This construction of the apparatus for overhead submerged arc welding ensures the possibility of the bowl swinging in both longitudinal and transverse planes thereof during welding thus enhancing copying of the surface of joints being welded and contributing to stabilization of preset flux pressures in the zone of the electrode and in the areas where the welding bath is formed, whereby the overhead welding can be carried out under optimum process conditions and high quality overhead welds can be obtained.

BRIEF DESCRIPTION OF THE DRAWINGS

The invention will now be described in detail with reference to a specific embodiment illustrated in the accompanying drawing which shows a longitudinal section view of an apparatus for overhead submerged arc welding according to the invention.

DESCRIPTION OF THE PREFERRED EMBODIMENT

An apparatus for overhead submerged arc welding according to the invention comprises a hopper 1 containing flux 2. The hopper 1 accommodates a bowl 3 in the top part thereof which is open on the side facing towards a work being welded 4. The bowl 3 is connected to a supply pipe 5 housing an auger 6 which is coupled, by means of bevel gears 7 and 8, to a drive 9. The pipe 5 and auger 6 provided in the hopper 1 are means for supplying flux 2 and for pressing it against the work. When the auger 6 is rotated by the drive 9, flux 2 is admitted to the bowl 3 from the hopper 1, through a port 10 in the bottom part of the supply pipe 5, and through the pipe 5.

The bowl 3 is designed for forming a flux backing and for exerting through the intermediary thereof a local pressure in the area extending along the joint being welded upstream of the arc with respect to the finished weld 11.

The hopper 1 is provided with a welding head 12 having a nozzle 13 for supplying a consumable electrode 14, e.g. from a coil 15 of electrode wire by means of a feeder mechanism of the welding head 12.

The nozzle 13 is mounted in the hopper 1 to extend through the bowl 3, and its end received in the bowl 3 is offset with respect to the supply pipe 5 in the direction opposite to the welding direction.

This offset of the nozzle 13 with respect to the supply pipe 5 is necessary because a non-uniform distribution of preset pressure exerted by flux 2 upon the work 4 being welded occurs in the zone of flux supply from the hopper 1 to the bowl 3. At the same time, to ensure stability of welding parameters, it is necessary that uniform pressure and distribution of pressure of flux 2 be provided in the arcing zone adjacent to the electrode 14.

This uniform distribution of pressure is achieved because the flux backing is pressed against the work 4 being welded under a constant preset pressure, and uniform distribution of this pressure along the welding zone is achieved owing to friction forces developing during relative movement of the work 4 being welded and the welding apparatus.

It should be noted that surplus flux that does not participate in welding spills freely back to the hopper 1 from the bowl 3.

Recirculation of flux 2 and its circulation from the hopper 1 to the welding zone thus occur to enhance economic effectiveness of welding.

A forming means 16 is provided adjacent to the welding nozzle 13 in a spaced relation to the electrode 14. The forming means 16 may be in the form of a bar made of a heat conductive and heat-resistant material with a surface profile cooperating with the flux backing and with the work 4 being welded so as to build up necessures in the welding zone and to form the finished weld 11. This bar can be cooled, e.g. with water or air.

To produce welded joints with a predetermined geometry of the weld reinforcement on the ceiling side, the forming means 16 may be made, e.g. in the form of a slider. In such cases, the slider is adapted for a direct contact with the weld being formed. The provision of the forming means 16 in the form of a slider enhances quality of surface of the finished weld 11.

The shape and profile of the contact surface of such a forming means 16 cooperating with the work during welding are chosen mainly in accordance with the joint type, desired shape and dimensions of the finished weld, grade and type of fluxes and welding conditions data.

According to the invention, a pivot pin 17 supporting the hopper 1 is provided on a front wall 18 of the forming means 16. In addition, the pivot pin 17 supporting the hopper 1 extends in parallel with a transverse axis of the forming means 16 and is aligned with the upper end face of a rear wall 19 of the bowl 3 located adjacent to the nozzle 13.

This structural embodiment of the apparatus in which the pivotal support of the hopper 1 with the bowl 3, supply pipe 5 with auger 6, and welding head 12 by means of the pivot pin 17 mounted on the front wall 18 of the forming means 16 to extend in parallel with the transverse axis thereof and alignment of the pivot pin 17 supporting the hopper 1 with the upper end face of the rear wall 19 of the bowl 3 located adjacent to the nozzle 13, and their interaction, allow the forming means 16 with the bowl 3 to carry out local copying of the surface of the joint being welded in the area of the welding bath with maximum accuracy, ensure swinging of the bowl 3 in the transverse plane, make it possible to get around misalignments of plate edges in an optimum way, prevent flux 2 from spilling and jamming between the forming means 16 and the rear end wall 19 of the bowl 3 and stabilize to a maximum possible degree the extension of the electrode 14 and preset thickness of the flux backing over the whole area thereof, i.e. over the surface area of the open part of the bowl 3.

To provide the necessary flux backing pressures to be exerted upon the work 4 being welded, the apparatus according to the invention is provided with a means for turning the hopper 1 about the pivot pin 17 supporting the hopper, which is in the form of, e.g. counterweights 20.

The counterweights 20 are made, e.g. removable, and their number is changed in accordance with preset welding conditions and desired flux backing pressure exerted upon the work 4 being welded.

The forming means 16 is supported by an arm 21 for swinging with respect to its longitudinal and transverse planes so as to ensure the possibility of copying of the surface of the work 4 being welded during welding.

The arm 21 is mounted on a carriage 22 which is adapted to move in the direction towards the work 4 being welded. The carriage 22 is mounted on appropriate tracks, e.g. in the form of a guide rail 23. The carriage 22 has a means for urging the forming means 16 against the work 4 being welded, which is in the form of a power actuator 24 (e.g. an air or hydraulic cylinder) for moving the carriage 22 towards the work 4 being welded.

The power actuator 24 may be of any other appropriate type, e.g. in the form of a spring means.

This construction of the urging means and the support of the forming means 16 on the arm 21 make it possible to create a highly sensitive system reacting to changes in profile of the work 4 being welded and automatically maintaining the necessary preset flux pressures in the welding zone.

The forming means 16 is so constructed in the area of its support on the arm 21 and is mounted on an abutment 25 of the arm 21 in such a manner as to ensure self-positioning of the forming means 16 with respect to the work 4 being welded.

For moving the apparatus in the welding direction, the welding device is provided with a driven trolley 26 which moves along a track 27. The guide rail 23 is rigidly secured to the trolley 26 for movement of the carriage 22, and the power actuator 24 for moving the carriage 22 is pivotally connected to the trolley. The driven trolley 26 has its own drive 28.

The driven trolley 26 is necessary for moving the whole apparatus along the joint being welded which is not infrequently desirable in producing longitudinal overhead welds in planar products that are difficult to handle.

Advantages of the apparatus described above are especially remarkable in producing sealing and one-pass overhead welds.

The above-described apparatus for overhead submerged arc welding functions in the following manner.

Flux 2 is loaded in the hopper 1 before welding. Composition of flux 2 used for the overhead welding is chosen mainly in accordance with the material of the work being welded, geometry of joints and welding conditions.

The flux to be used mainly contains the following components: silicon, manganese, phosphorus, sulfur, and other additives ensuring stability of arc, fusion of the work material, protection of the welding bath and formation of the finished weld.

Before starting the welding, the apparatus for overhead submerged arc welding is placed under the work 4 being welded. There are two options in doing this. In welding elongated straight joints of large-size structures, the apparatus is generally moved along the joint being welded.

In welding rotatable structures, the apparatus remains stationary, and the structure is caused to rotate about its own axis in such a manner that the joint being welded be in the zone of the electrode.

When the apparatus is placed under the work 4 being welded, the power actuator 24 of the carriage 22 adjusted for welding of a given work is switched on to urge the forming means 16 against the work 4 being welded by means of the carriage 22 mounted on the guide rail 23 of the arm 21 having the abutment 25 at the end thereof.

This pressure of the forming means 16 is carried out until its top face comes in touch with the outer surface of the work 4 being welded and the forming means 16 is self-positioned with respect to this surface of the joint being welded.

During the pressure against, and self-positioning of the forming means 16 with respect to the surfaces of the joint being welded the bowl 3 is also positioned with respect to the same surface. This positioning of the bowl 3 occurs by rotation of the bowl about the pivot pin 17 supporting the hopper 1, which is mounted on the front wall 18 of the forming means 16 and aligned with the upper end face of the rear wall 19 of the bowl 3.

The drive 9 of the hopper 1 which is also adjusted for welding of a given type of the work 4 being welded is then switched on to rotate the auger 6 through the bevel gears 7 and 8. As the auger 6 is caused to rotate, flux 2 is supplied through the port 10 and through the pipe 5 to the bowl 3. Flux 2 supplied to the bowl 3 acts upon the surface of the joint being welded at the point of welding and forms a flux backing.

Then the drive 28 of the trolley 26 is switched on (it is switched on in welding longitudinal joints, whereas in welding annular joints the drive 28 is not switched on, but a rotary drive is switched on to rotate the work, which is not shown in the drawings), and the trolley moves along the track 27.

Voltage is then applied to the consumable electrode 14, the feeder mechanism of the welding head 12 is switched on to supply the consumable electrode 14 from the coil 15 through the nozzle 13 to the joint being welded. Welding of the joint is carried out. The finished weld 11 is thus formed.

The accompanying drawing shows the embodiment for welding longitudinal joints with moving apparatus for overhead submerged arc welding.

During movement of the apparatus along the joint being welded, the forming means 16 mounted on the abutment 25 for self-positioning cooperates with the surface of the work 4. Upon a change in shape of the surface of the work 4, the forming means 16 copies the profile of the work and, depending on the nature of change in shape, it acts upon the arm 21.

The power actuator 24 of the carriage 22 ensures permanent pressure of the forming means 16 against the surface of the work 4 being welded.

Supporting the forming means 16 on the abutment 25 of the arm 21 for swinging in its transverse and longitudinal planes ensures copying of the surface of the work 4 being welded by the forming means, and the fact that the pivot pin 17 supporting the hopper 1 is mounted on the front wall 18 of the forming means 16 ensures swinging of the bowl 3 in the transverse plane which is necessary in case there are local changes in assembly and geometry of the joint being welded. In this case, not only the forming means 16, but also the upper face of the outlet port of the bowl 3 will copy the surface of the work 4 being welded in the welding zone so as to provide preset flux pressures necessary for high-quality welding and to maintain them at a constant level during welding. With such engagement between the forming means 16 and bowl 3 (through the intermediary of the flux backing) and the joint being welded, overhead welds may be produced with a better quality of their surface in comparison with the prior art. In this case, the finished weld 11 will have preset dimensions even with maximum admissible errors of assembly and geometry of joints; it will have smooth transition between weld and base metal of the work being welded and feature good external appearance and high finish surface.

This welding mode is generally used for producing sealing and one-pass welds that will not have to be further machined and also in producing penetration welds, e.g. in welding very critical structures where high accuracy of geometry of the penetration welds is required.

Therefore, the apparatus for overhead submerged arc welding according to the invention allows quality of overhead welds to be enhanced, the range of products being welded enlarged and overhead welding to be carried out in the automatic mode.

Favorable conditions are provided for producing high-quality welds over a large range of process capabilities.

The apparatus for overhead submerged arc welding according to the invention ensures reliable copying of the surface of the joint being welded by the forming means and the bowl connected thereto irresective of joint assembly and geometry errors and fluxes used for welding (vitreous, pumice-like, ceramic, and the like). This copying of the joint enlarges the range of products to be welded and process capabilities, enhances quality of welded joints owing to stabilization of flux pressure in the area of the electrode and at points of formation of the welding bath.

To the most advantage the present invention may be used for welding longitudinal and rotatable annular joints during production of welded constructions having different thickness of billets or sheets being welded.

We clam:

1. An apparatus for overhead submerged-arc welding, comprising:

a driven trolley supporting a vertical slide with a carriage;

a forming means mounted for swinging with respect to longitudinal and transverse planes with respect to a longitudinal axis of a joint being welded, the forming means being mounted on an abutment at the end of one arm mounted on the carriage of the vertical slide;

a hopper containing flux mounted on a pivot pin and accommodating a nozzle for a consumable electrode;

a bowl provided in a top part of the hopper, the nozzle for a consumable electrode extending through the bowl; and means for supplying the flux and for pressing it against a work, the pivot pin supporting the hopper being provided on a front wall of the forming means to extend in parallel with a transverse axis thereof and being aligned with an upper end face of a rear wall of the bowl located adjacent to the nozzle.

* * * * *